United States Patent [19]
Ooiwa et al.

[11] Patent Number: 5,949,166
[45] Date of Patent: Sep. 7, 1999

[54] RECTIFYING APPARATUS FOR AN AUTOMOTIVE AC GENERATOR

[75] Inventors: Tooru Ooiwa, Toyota; Tsutomu Shiga, Nukata-gun; Koichi Ihata, Okazaki, all of Japan

[73] Assignee: Denso Corporation, Kariya, Japan

[21] Appl. No.: 09/035,813

[22] Filed: Mar. 6, 1998

[30] Foreign Application Priority Data

Sep. 25, 1997 [JP] Japan .................................... 9-260302

[51] Int. Cl.[6] ............................ H02K 11/00; H02K 1/32; H02K 9/02
[52] U.S. Cl. ..................... 310/68 D; 310/58; 310/60 R; 310/60 A; 310/64; 363/141; 363/144; 363/145
[58] Field of Search .............................. 310/52, 58, 60 R, 310/60 A, 64, 68 D, 71, 89, 91; 363/141, 142, 144, 145, 146

[56] References Cited

U.S. PATENT DOCUMENTS

| 3,970,881 | 7/1976 | Sato ...................................... 310/68 D |
| 4,419,597 | 12/1983 | Shiga et al. ........................... 310/68 D |
| 4,604,538 | 8/1986 | Merrill et al. ......................... 310/68 D |
| 4,606,000 | 8/1986 | Steele et al. ........................... 363/145 |
| 4,952,829 | 8/1990 | Armbruster et al. ................. 310/68 D |
| 5,473,208 | 12/1995 | Stihi ..................................... 310/68 D |
| 5,640,062 | 6/1997 | Yockey ................................. 310/68 D |
| 5,677,616 | 10/1997 | Ooiwa ...................................... 322/17 |
| 5,682,070 | 10/1997 | Adachi et al. ............................ 310/71 |
| 5,710,467 | 1/1998 | Irie et al. .................................. 310/64 |
| 5,757,096 | 5/1998 | DuBois et al. ........................ 310/68 D |
| 5,838,544 | 11/1998 | Wei ....................................... 361/704 |

FOREIGN PATENT DOCUMENTS

| 2-500630 | 3/1990 | Japan . |
| 7-36687 | 4/1995 | Japan . |
| 1087857 | 10/1967 | United Kingdom . |

*Primary Examiner*—Nestor Ramirez
*Assistant Examiner*—Tran N Nguyen
*Attorney, Agent, or Firm*—Pillsbury Madison & Sutro LLP

[57] ABSTRACT

A larger-diameter fin is provided adjacent to a frame, while a smaller-diameter fin is provided adjacent to a protecting cover. The larger-diameter fin and the smaller-diameter fin are arranged parallel to each other in an axial direction with an intervening clearance so that their rectifying elements are disposed at opposite directions each other. The larger-diameter fin is offset outward in a radial direction. The smaller-diameter fin is offset inward in the radial direction. The protecting cover has an axial opening which introduces external air directly to the positive rectifying element. Furthermore, a radial ventilation passage is formed between the larger-diameter fin and the frame so as to pass the central position of the negative rectifying element. An opening, introducing external air directly, is formed at a radial-outer end of the radial ventilation passage.

21 Claims, 9 Drawing Sheets

RECTIFYING APPARATUS FOR AN AUTOMOTIVE AC GENERATOR

BACKGROUND OF THE INVENTION

The present invention relates to a rectifying apparatus for an automotive AC generator.

Increasing an effective capacity in a passenger compartment is an important matter to be realized for recent automotive vehicles. Thus, it is earnestly required to reduce the space of an engine room. Automotive AC generators are one of objects to be downsized. Accordingly, an important subject is to improve the cooling performance of a rectifying apparatus for an automotive AC generator, while maintaining adequate cooling efficiency against deterioration of temperature environment in the engine room or downsizing of the automotive AC generator itself.

For example, FIG. 11 shows a conventional automotive AC generator. According to this conventional automotive AC generator, both of positive and negative fins 101 and 102 mount rectifying elements 100 thereon. These fins 101 and 102 are arranged parallel to each other in an axial direction. A protecting cover 103 has two cooling air inlets 104 opened at predetermined portions near the rectify elements 100. External air is directly introduced to the rectifying elements. More specifically, the back surfaces of the fins 101 and 102 are cooled by the cooling air.

However, according to the arrangement of the above-described conventional rectify apparatus, the cooling air is introduced toward the centers of the rectifying elements 100 but directly guided to the back surfaces of the cooling fins 101 and 102. In other words, this arrangement is disadvantageous in that the cooling air cannot be smoothly conveyed to the element mounting surfaces of the cooling fins 101 and 102. Furthermore, the temperature of the cooling air will be increased undesirably when it arrives the rectifying elements 100, because the cooling air is brought into contact with warmed-up members before it reaches the downstream side. Thus, the cooling efficiency is worsened significantly.

SUMMARY OF THE INVENTION

In view of the foregoing problems encountered in the prior art, the present invention has an object to provide a rectify apparatus which is capable of remarkably improving the cooling performance by effectively introducing the cooling air to the rectifying elements and the cooling fins.

In order to accomplish the above-described and other related objects, the present invention provides a novel and excellent rectifying apparatus for an automotive AC generator. According to the present invention, the cooling fins can maintain sufficient surface areas. The cooling air is guided to both the front and rear surfaces of each cooling fin. The external air is directly introduced to the rectifying elements from both the axial direction and the radial direction. The flow speed of the cooling air is increased by partly narrowing a cross-sectional area of a ventilation passage. Thus, the heat transferring performance can be improved. The rectifying apparatus can be effectively cooled.

According to a first aspect of the present invention, the automotive AC generator has a rectifier disposed between a frame and a protecting cover. The rectifier comprises negative rectifying elements, a larger-diameter fin of negative electric potential which mounts the negative rectifying elements, positive rectifying elements, a smaller-diameter fin of positive electric potential which mounts the positive rectifying elements. Each of the rectifying elements has a lead. The larger-diameter fin is disposed adjacent to the frame and the smaller-diameter fin is disposed adjacent to the protecting cover. The larger-diameter and smaller-diameter fins are arranged parallel to each other in an axial direction with a predetermined clearance so that their leads extend in opposite directions in a space between the larger-diameter and smaller-diameter fins. A radial-inner end of the larger-diameter fin is positioned outward than a radial center of the positive rectifying elements. A radial-outer end of the smaller-diameter fin is positioned inward than a radial center of the negative rectifying elements. The protecting cover has an axial air inlet at a position corresponding to the center of the positive rectifying elements. The axial air inlet introduces external air directly to the positive rectifying elements. A radial ventilation passage is provided between the larger-diameter fin and the frame, so as to pass the center of the negative rectifying elements. An opening, which introduces external air directly, is formed on the protecting cover, or between the frame and the protecting cover, or the larger-diameter fin and the protecting cover, at a portion corresponding to the radial-outer end of the radial ventilation passage.

In other words, the rectifier (5) comprises negative rectifying elements (504), a larger-diameter fin (503) of negative electric potential which mounts the negative rectifying elements, positive rectifying elements (502), a smaller-diameter fin (501) of positive electric potential which mounts the positive rectifying elements, each rectifying element has a lead, and the rectifier is disposed between the frame (3b) and the protecting cover (8). The larger-diameter fin is disposed adjacent to the frame with a predetermined axial clearance. The smaller-diameter fin is disposed adjacent to the protecting cover with a predetermined axial clearance. The larger-diameter and smaller-diameter fins are arranged parallel to each other in an axial direction with a predetermined clearance so that their leads extend in opposite directions in a space between the larger-diameter and smaller-diameter fins. A radial-inner end of the larger-diameter fin is disposed adjacent to the positive rectifying elements, and positioned radially outward than a radial center position of the positive rectifying elements. A radial-outer end of the smaller-diameter fin is disposed adjacent to the negative rectifying elements, and positioned radially inward than a radial center position of the negative rectifying elements. The protecting cover has an axial opening (801) which introduces external air directly to the center of the positive rectifying elements. A radial ventilation passage (810) is disposed between the larger-diameter fin and the frame so as to pass the center of the negative rectifying elements. And, an opening (802) is formed at least at one selected from the group consisting of a portion on the protecting cover, a clearance between the frame and the protecting cover, and a clearance between the larger-diameter fin and the protecting cover, for introducing external air directly to a radial-outer end of said radial ventilation passage.

The above-described arrangement brings the following functions and effects. As the smaller-diameter fin and the larger-diameter fin are offset in both the axial and radial directions, each fin can maintain a sufficient surface area.

Furthermore, as the cooling air can pass a clearance between the element-mounting surfaces of these fins, the introduced cooling air can be guided to both surfaces of each cooling fin. Thus, the fins and the rectifying elements can be adequately cooled.

Furthermore, the larger-diameter fin and the smaller-diameter fin are arranged parallel to each other in the axial direction with a predetermined clearance so that their leads extend in opposite directions in a space between the larger-diameter fin and the smaller-diameter fin. The radial-outer end of the smaller-diameter fin is disposed radially inward than the radial center position of the negative rectifying elements. The radial-inner end of the larger-diameter fin is disposed radially outward than the radial center position of the positive rectifying elements. Thus, the leads are offset to the radially inward and outward positions. Therefore, any interference between the fins and the leads can be eliminated. An axial clearance between these parallel fins can be reduced.

Accordingly, the flow speed can be increased when the cooling air passes this clearance. The cooling air hits the cooling fins at a high speed. The heat transfer efficiency can be improved. The rectifying elements can be cooled adequately.

Moreover, the smaller-diameter fin and the larger-diameter fin receive the cooling air independently from the axial air inlet opened on the protecting cover and the radial air inlet, respectively. Thus, the member located at the downstream side is not subjected to warmed-up air in the cooling air flow. In other words, low-temperature external air can be surely and directly conveyed to the rectifying elements. The heated portions can be directly and effectively cooled.

The larger-diameter fin faces the frame at a surface mounting no element, while the smaller-diameter fin faces the protecting cover at a surface mounting no element. Thus, it becomes possible to eliminate the interference between the fins and the frame or the protecting cover. The clearances between the fins and the frame or the protecting cover can be reduced. Hence, the flow speed can be increased when the cooling air passes these clearances. The cooling air hits the cooling fins at a high speed. The heat transfer efficiency can be improved. The rectifying elements can be cooled adequately.

In the same manner, the rectifying elements mounted on the smaller-diameter fin and the rectifying elements mounted on the larger-diameter fin are offset in both the axial and radial directions. Thus, it becomes possible to reduce the clearance between the parallel fins without causing any interference between the fins and the rectifying elements or their leads. Accordingly, the flow speed can be increased when the cooling air passes this clearance. The cooling air hits the cooling fins at a high speed. The heat transfer efficiency can be improved. The rectifying elements can be cooled adequately.

In addition, the entire body of the apparatus can be downsized due to the reduced clearances at various portions. This contributes the reduction of space, an auxiliary effect.

An automotive AC generator in accordance a second aspect of the present invention is characterized in that the rectifier is disposed inside the frame, which differs from the above-described first aspect of the present invention which locates the rectifier outside the frame.

More specifically, the rectifier is disposed between the frame and a partition plate. The rectifier comprises positive rectifying elements, a larger-diameter fin of positive electric potential which mounts the positive rectifying elements, negative rectifying elements, a smaller-diameter fin of negative electric potential which mounts the negative rectifying elements. Each rectifying element has a lead. The larger-diameter fin is disposed adjacent to the partition plate and the smaller-diameter fin is disposed adjacent to the frame. The larger-diameter and smaller-diameter fins are arranged parallel to each other in an axial direction with a predetermined clearance so that their leads extend in opposite directions in a space between the larger-diameter and smaller-diameter fins. A radial-inner end of the larger-diameter fin is positioned outward than a radial center of the negative rectifying elements. A radial-outer end of the smaller-diameter fin is positioned inward than a radial center of the positive rectifying elements. The frame has an axial air inlet at a position corresponding to the center of the negative rectifying elements. The axial air inlet introduces external air directly to the negative rectifying elements. A radial ventilation passage is provided between the larger-diameter fin and the partition plate, so as to pass the center of the positive rectifying elements. An opening, which introduces external air directly, is formed on the frame at a portion corresponding to a radial-outer end of the radial ventilation passage.

In other words, the rectifier (5) comprises positive rectifying elements (502), a larger-diameter fin (503) of positive electric potential which mounts the positive rectifying elements, negative rectifying elements (504), a smaller-diameter fin (501) of negative electric potential which mounts the negative rectifying elements. Each rectifying element has a lead. The rectifier is disposed between the frame (3*b*) and the partition plate (9). The larger-diameter fin is disposed adjacent to the partition plate with a predetermined axial clearance. The smaller-diameter fin is disposed adjacent to the frame with a predetermined axial clearance. The larger-diameter fin and the smaller-diameter fin are arranged parallel to each other in an axial direction with a predetermined clearance so that their leads extend in opposite directions in a space between the larger-diameter fin and the smaller-diameter fin. A radial-inner end of the larger-diameter fin is disposed adjacent: to the negative rectifying elements, and positioned radially outward than a radial center position of the negative rectifying elements. A radial-outer end of the smaller-diameter fin is disposed adjacent to the positive rectifying elements, and positioned radially inward than a radial center position of the positive rectifying elements. The frame has an axial opening (801*a*) which introduces external air directly to the center of the negative rectifying elements. A radial ventilation passage (810) is disposed between the larger-diameter fin and the partition plate so as to pass the center of the positive rectifying elements. And, an opening (802*a*) is formed on the frame for introducing external air directly to a radial-outer end of the radial ventilation passage.

The above-described arrangement brings the following functions and effects. As the smaller-diameter fin and the larger-diameter fin are offset in both the axial and radial directions, each fin can maintain a sufficient surface area.

Furthermore, as the cooling air can pass a clearance between the element-mounting surfaces of these fins, the introduced cooling air can be guided to both surfaces of each cooling fin. Thus, the fins and the rectifying elements can be adequately cooled.

Furthermore, the larger-diameter fin and the smaller-diameter fin are arranged parallel to each other in the axial direction with a predetermined clearance so that their leads extend in opposite directions in a space between the larger-diameter fin and the smaller-diameter fin. The radial-outer end of the smaller-diameter fin is disposed radially inward than the radial center position of the positive rectifying elements. The radial-inner end of the larger-diameter fin is disposed radially outward than the radial center position of the negative rectifying elements. Thus, the leads are offset to the radially inward and outward positions. Therefore, any interference between the fins and the leads can be eliminated. An axial clearance between these parallel fins can be reduced.

Accordingly, the flow speed can be increased when the cooling air passes this clearance. The cooling air hits the cooling fins at a high speed. The heat transfer efficiency can be improved. The rectifying elements can be cooled adequately.

Moreover, the smaller-diameter fin and the larger-diameter fin receive the cooling air independently from the axial air inlet opened on the protecting cover and the radial air inlet, respectively. Thus, the member located at the downstream side is not subjected to warmed-up air in the cooling air flow. In other words, low-temperature external air can be surely and directly conveyed to the rectifying elements. The heated portions can be directly and effectively cooled.

The larger-diameter fin faces the partition plate at a surface mounting no element, while the smaller-diameter fin faces the frame at a surface mounting no element. Thus, it becomes possible to eliminate the interference between the fins and the frame or the protecting cover. The clearances between the fins and the frame or the protecting cover can be reduced. Hence, the flow speed can be increased when the cooling air passes these clearances. The cooling air hits the cooling fins at a high speed. The heat transfer efficiency can be improved. The rectifying elements can be cooled adequately.

In the same manner, the rectifying elements mounted on the smaller-diameter fin and the rectifying elements mounted on the larger-diameter fin are offset in both the axial and radial directions. Thus, it becomes possible to reduce the clearance between the parallel fins without causing any interference between the fins and the rectifying elements or their leads. Accordingly, the flow speed can be increased when the cooling air passes this clearance. The cooling air hits the cooling fins at a high speed. The heat transfer efficiency can be improved. The rectifying elements can be cooled adequately.

In addition, the entire body of the apparatus can be downsized due to the reduced clearances at various portions. This contributes the reduction of space, an auxiliary effect.

Preferably, the frame is directly brought into contact with and fixed to the fin which mounts the negative rectifying elements. With this arrangement, the cooling performance of the rectifying elements can be improved.

Preferably, the smaller-diameter fin has a rib (510, 511) formed at least partly on a radial-inner or radial-outer end thereof This rib of the smaller-diameter fin extends in an axial direction away from the larger-diameter fin. Thus, the cooling air introduced from the axial air inlet can be guided toward the rectifying elements by the smaller-diameter fin. The flow speed can be increased when the cooling air passes in the vicinity of the rectifying elements. The heat transfer efficiency can be improved. Each fin can secure a sufficient area. The cooling performance can be further improved.

Furthermore, the smaller-diameter fin functions as a flow regulating plate which smoothly guides the introduced cooling air. Thus, the fan noise can be reduced.

Moreover, the rib of the smaller-diameter fin is bent far away from the larger-diameter fin which has a different electric potential. This arrangement brings an auxiliary effect that any deposition of foreign materials or corrosion products can be avoided.

Preferably, the larger-diameter fin has a rib (512) formed at a radial-inner end thereof The rib of the larger-diameter fin extends toward the rotor in an axial direction away from the smaller-diameter fin. Thus, the cooling air introduced from the radial air inlet can be guided smoothly toward the cooling fan by the larger-diameter fin. The flow speed can be increased when the cooling air passes in the vicinity of the rectifying elements. The heat transfer efficiency can be improved. Each fin can secure a sufficient area. The cooling performance can be further improved.

Furthermore, the rib of the larger-diameter fin, together with the remaining portion, functions as a flow regulating plate which smoothly guides the introduced cooling air. Thus, the fan noise can be reduced.

Moreover, the rib of the larger-diameter fin is bent Far away from the smaller-diameter fin which has a different electric potential. This arrangement brings an auxiliary effect that any deposition of foreign materials or corrosion products can be avoided.

Preferably, the smaller-diameter fin has a closed ring shape. In other words, the smaller-diameter fin has a ring-plate configuration. Thus, the heat transfer performance of the fin is entirely improved. The heat distribution is uniformed. The entire body of the fin can be effectively utilized as a cooling medium. Each fin can secure a sufficient surface area. The cooling performance can be further improved.

Preferably, the frame has a support portion (301) supporting the bearing (3d) and extending in a radial direction. A cooling air inlet (803) is divided by the supporting portion. A terminal base (513) is interposed between the smaller-diameter fin and the larger-diameter fin to support the smaller-diameter and larger-diameter fins in an insulated condition. The terminal base has a stator lead terminal for connecting the leads to the stator. The rectifier is fixed to the support portion of the frame together with the terminal base. The terminal base exposes the smaller-diameter fin and the larger-diameter fin at the region other than the support portion of the frame.

Especially, according to the above-described arrangement, the ventilation clearance is formed between the terminal base and at least one, preferably both, of the fins. Accordingly, the cooling air is smoothly conveyed from the radial-outer end of the terminal base to the radial-inner end of the terminal base.

Accordingly, a space between the smaller-diameter fin and the larger-diameter fin, which insulates both fins and is closed when the leads of the rectifying elements are connected to the stator, can be minimized.

Furthermore, the cooling air passage, extending from the radial-inner end of the larger-diameter fin to the cooling air inlet of the frame via a clearance between the smaller-diameter fin and the larger-diameter fin, can be shortened. Furthermore, curves and obstacles can be reduced. Accordingly, the cooling air can flow smoothly toward the cooling fan. The flow speed can be increased when,the cooling air passes in the vicinity of the rectifying elements. The heat transfer efficiency can be improved. An effective cooling fin area can be secured. The cooling performance can be further improved. Moreover, as the introduced air flows smoothly, the fan noise can be reduced, as an auxiliary effect.

In the foregoing description, the "center of the rectifying element" is a central position of the rectifying element in both radial and circumferential directions. Reference numerals in parenthesis, added in the above description, are merely used for expediting the understanding to the present invention and not used for narrowly interpreting the scope of the present invention.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Figure 1:
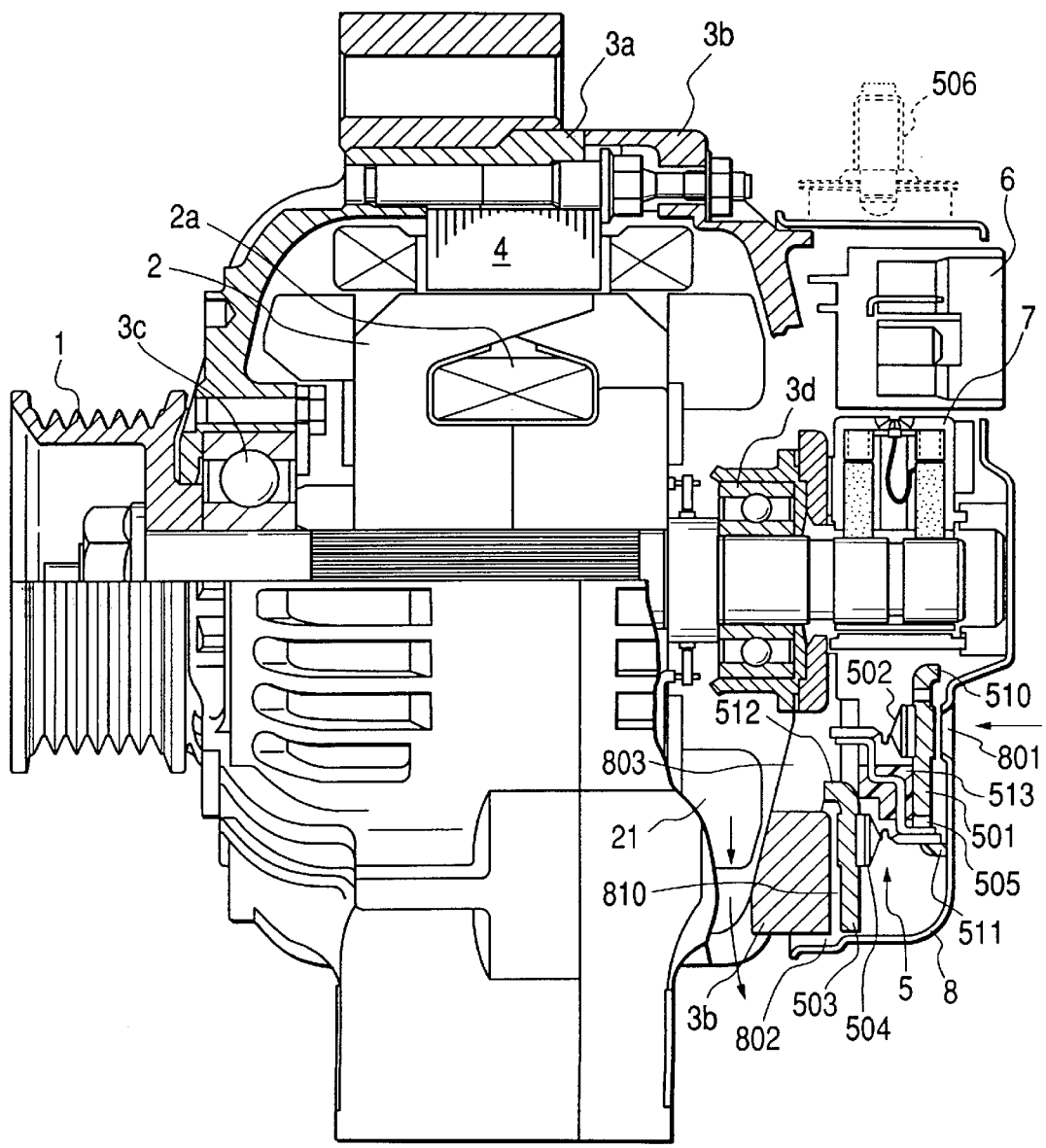
FIG. 1 is a partly cross-sectional view showing an automotive AC generator in accordance with a first embodiment of the present invention.
Figure 2:
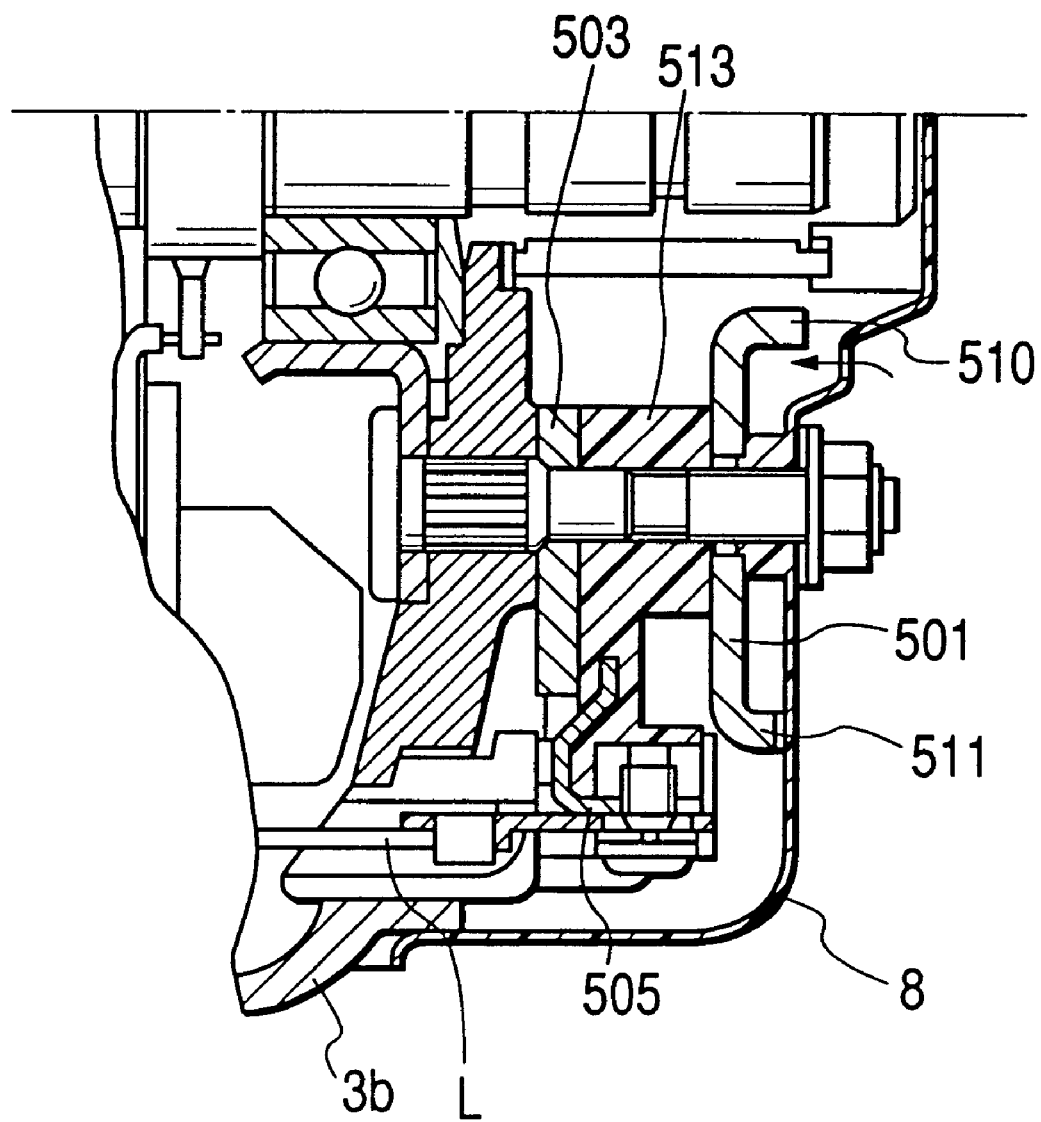
FIG. 2 is a partly enlarged cross-sectional view showing an essential part of the automotive AC generator shown in FIG. 1.
Figure 3:
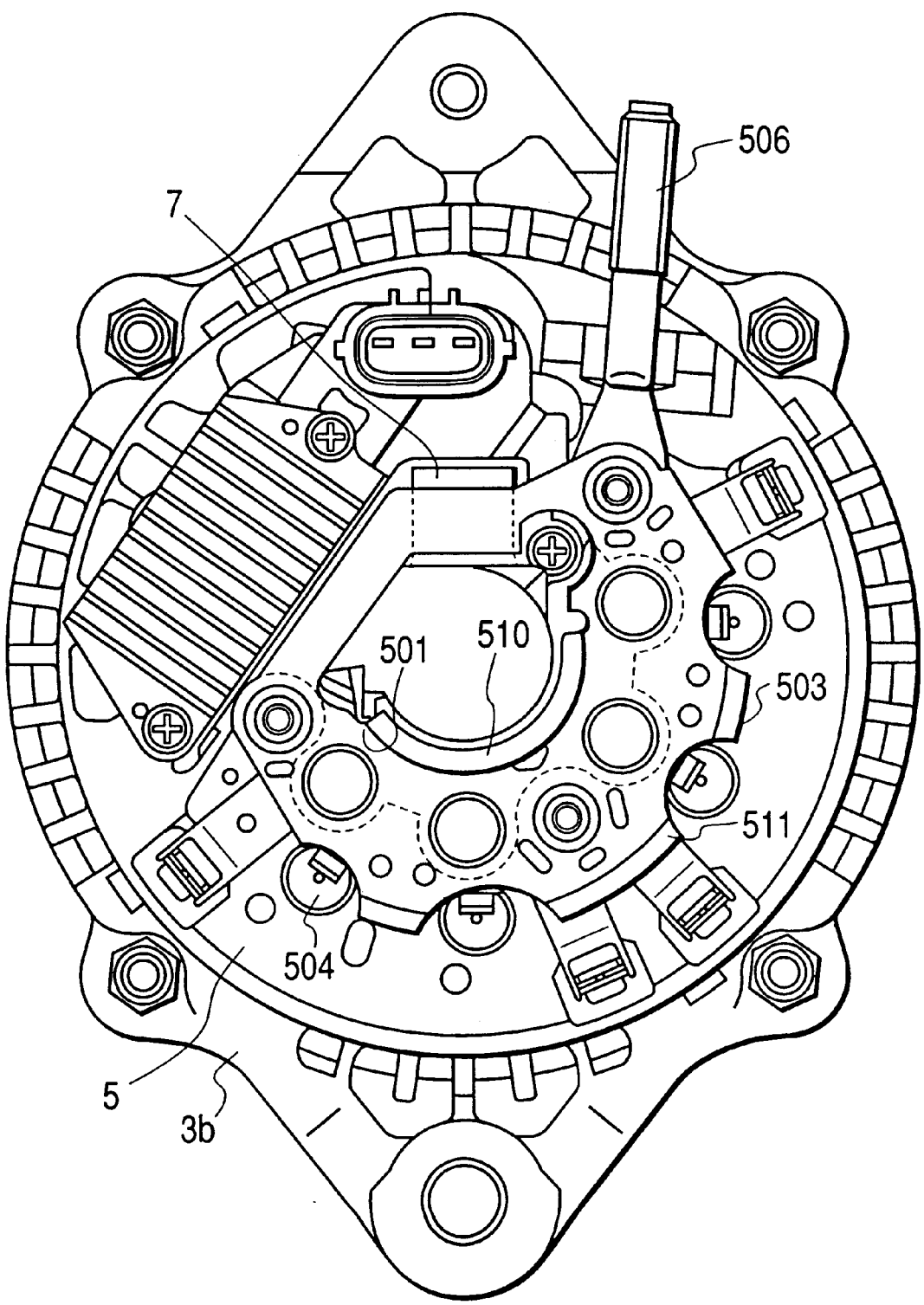
FIG. 3 is a plan view showing the automotive AC generator shown in FIG. 1 in a condition where a protecting cover is removed.
Figure 4:
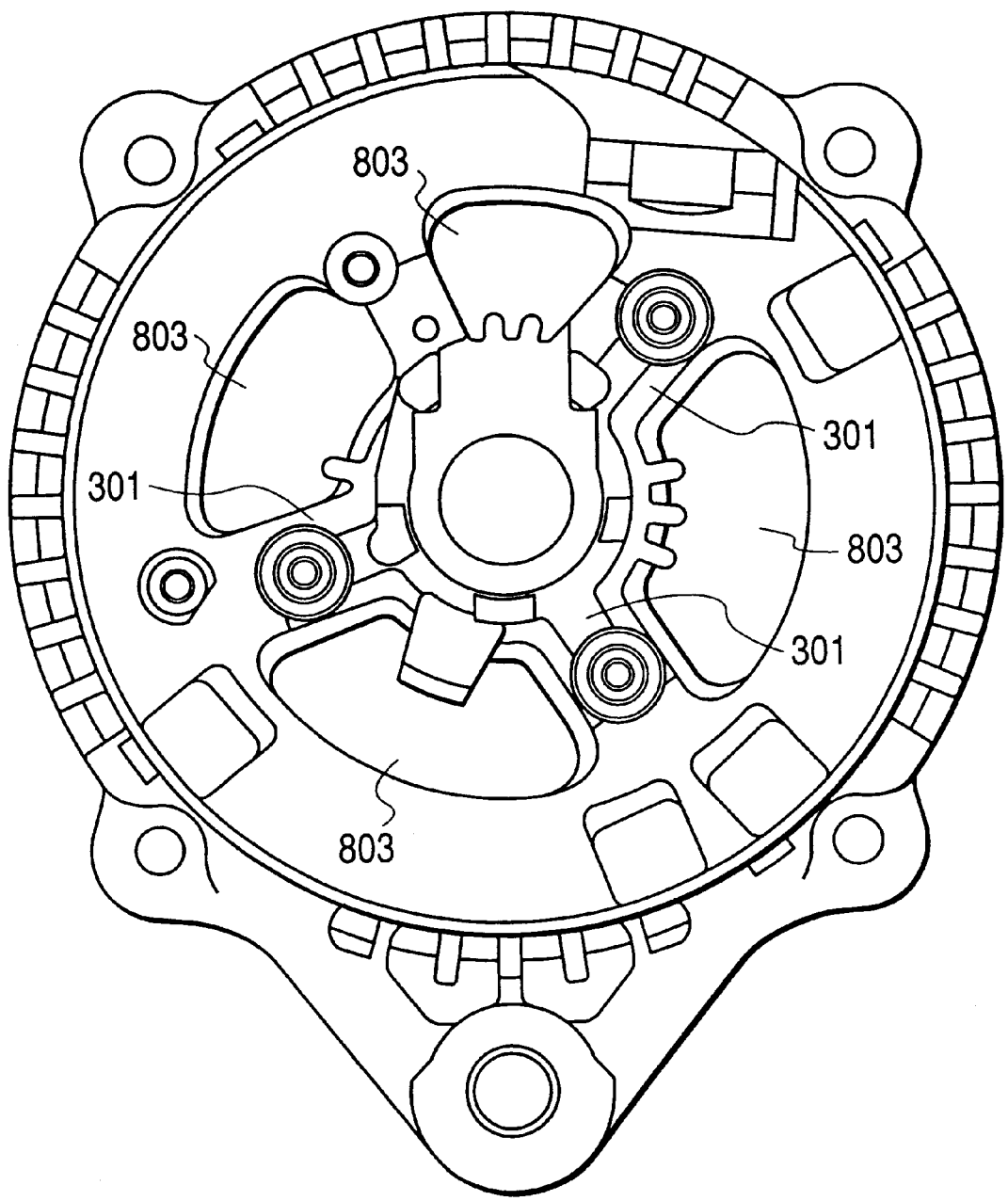
FIG. 4 is a plan view showing the automotive AC generator shown in FIG. 1 in a condition where both a rectifier and the protecting cover are removed.

Preferred embodiments of the present invention will be explained hereinafter with reference to accompanied drawings. Identical parts are denoted by the same reference numerals throughout the drawings.

First Embodiment

An automotive AC generator in accordance with a first embodiment of the present invention will be explained with reference to FIGS. 1 through 5.

The automotive AC generator of the present invention is a so-called alternator for an automotive vehicle. A rotational force of an engine (not shown) is transmitted via a belt (not shown) and a pulley 1 to a rotor 2. Bearings 3c and 3d support the rotor 2 rotatably. A stator 4 is securely fixed inside frames 3a and 3b so as to surround the rotor 2. The stator 4 generates an AC voltage as a result of interaction with a rotary magnetic field generated in accordance with rotation of the rotor 2. A rectifier 5 converts the AC power into DC power. A regulator 6 regulates the DC power rectified by the rectifier 5 and produces a regulated voltage of a predetermined value. A brush 7 supplies exciting current to a field winding 2a of the rotor 2. A protecting cover 8 is fixed to an end face of the frame 3b so as to cover the stator 4, the rectifier 5, the regulator 6 and the brush 7.

The rectifier 5 is interposed between the frame 3b and the protecting cover 8. The rectifier 5 is fixedly fastened to a bearing box support 301 of the frame 3b together with the protecting cover 8. A smaller-diameter fin 501, having a positive electric potential, securely mounts positive rectifying elements 502 by soldering. Each positive rectifying element 502 has a lead which extends toward a larger-diameter fin 503. The larger-diameter fin 503, having a negative electric potential, securely mounts negative rectifying elements 504 by soldering each negative rectifying element 504 has a lead which extends toward the smaller-diameter fin 503. These leads are connected to a stator lead L via a stator lead connecting terminal 505. The above-described arrangement constitutes an AC bridge circuit. B bolt 506, deriving an AC power output, is attached on the smaller-diameter fin 501 of positive electric potential.

In this embodiment, the positive rectifying element 502 is a diode provided at a higher-voltage side in the full-wave rectifying circuit, while the negative rectifying element 504 is a diode provided at a lower-voltage side in that rectifying circuit.

The smaller-diameter fin 501 and the positive rectifying elements 502 are disposed inward in a radial direction and adjacent to the protecting cover 8 in an axial direction. The larger-diameter fin 503 and the negative rectifying elements 504 are disposed outward in the radial direction and adjacent to the frame 3b in the axial direction. An axial air inlet 801 is opened on the protecting cover 8 at a portion adjacent to the positive rectifying elements 502. A radial air inlet 802 is opened between the outer peripheral portion of the frame 3b and the protecting cover 8. Thus, external air, serving as cooling air, is introduced directly to the positive and negative rectifying elements 502 and 504.

The protecting cover 8, the smaller-diameter fin 501, the larger-diameter fin 503 and the frame 3b are separated one another by intervening clearances. Each clearance has an axial width equal to or less than 10 mm. Thus, the flowing speed of the cooling air is increased so that both the smaller-diameter fin 501 and the larger-diameter fin 503 are adequately cooled.

The smaller-diameter fin 501 has a closed ring shape. This is advantageous because the heat transfer of the smaller-diameter fin 501 is improved and the heat distribution is uniformed. Accordingly, the entire body of this fin can be effectively used as a cooling medium. The smaller-diameter fin 501 can secure a sufficient surface area. Thus, it becomes possible to improve the cooling performance.

The larger-diameter fin 503 is directly fastened to the frame 3b. This is advantageous because the hear of the larger-diameter fin 503 is smoothly transferred to the frame 3b. Thus, the cooling performance can be further improved.

The smaller-diameter fin 501 has a rib 510 at a radial-inner end and a rib 511 at a radial-outer end. These ribs 510 and 511 are formed by bending the radial-inner and radial-outer ends of the smaller-diameter fin 501 toward the protecting cover 8. With this arrangement, the cooling air introduced from the axial air inlet 801 is guided toward the rectifying elements 502. The flow speed of the cooling air is increased in the vicinity of the rectifying elements 502. The heat transfer coefficient is improved. The smaller-diameter fin 501 can secure a sufficient surface area. Thus, the cooling performance can be further improved. Furthermore, the smaller-diameter fin 501 functions as a flow regulating plate from its structure and disposed position. The introduced cooling air can flow smoothly. Fan noise can be reduced. Moreover, the ribs 510 and 511 are bent far away from the larger-diameter fin 503 which has a different electric potential. This arrangement brings an auxiliary effect that any deposition of foreign materials or corrosion products can be avoided.

The larger-diameter fin 503 has a rib 512 which is formed by bending a radial-inner end of the larger-diameter fin 503 toward the frame 3*b*. This arrangement is advantageous because the cooling air introduced from the radial air inlet 802 is smoothly guided by the larger-diameter fin 503 toward the cooling fan 21. Accordingly, the flow speed of the cooling air is increased in the vicinity of the rectifying elements. The heat transfer coefficient is improved. The larger-diameter fin 503 can secure a sufficient surface area. Thus, the cooling performance can be further improved. Furthermore, the rib 512 functions as a flow regulating plate together with the other portion of the larger-diameter fin 503. The introduced cooling air can flow smoothly. Fan noise can be reduced. Moreover, the rib 512 is bent far away from the smaller-diameter fin 501 which has a different electric potential. This arrangement brings an auxiliary effect that any deposition of foreign materials or corrosion products can be avoided.

A total of three terminal bases 513 are interposed between the smaller-diameter fin 501 and the larger-diameter fin 503. The terminal bases 513 are fixed on three supporting portions 301 extending in radial directions for supporting a bearing box 3*d*. Both the smaller-diameter fin 501 and the larger-diameter fin 503 are fixed to the terminal bases 513 together with the supporting portions 301. Both the smaller-diameter fin 501 and the larger-diameter fin 503 are exposed from the clearances between the terminal bases 513. A space between the smaller-diameter fin 501 and the larger-diameter fin 503, which insulates these fins and is closed when the leads of the rectifying elements 502 and 504 are connected to the stator 4, can be minimized. The larger-diameter fin 503 is exposed at a portion adjacent to a radial-outer end of a cooling air inlet 803 of the frame 3*b*. This makes it possible to provide a shortest radial cooling air passage 810 extending from the radial-outer end of the larger-diameter fin 503 to the cooling air inlet 803 of the frame 3*b* via a clearance between the frame 3*b* and the larger-diameter fin 503 as well as between the smaller-diameter fin 501 and the larger-diameter fin 503. Thus, the cooling air flows smoothly toward the cooling fan 21. The flow speed of the cooling air is increased in the vicinity of the rectifying elements 504. The heat transfer coefficient is improved. An effective cooling fin are a can be secured. Thus, the cooling performance can be further improved.

Moreover, the introduced cooling air flows smoothly. The fan noise can be reduced as an auxiliary effect.

Figure 5:
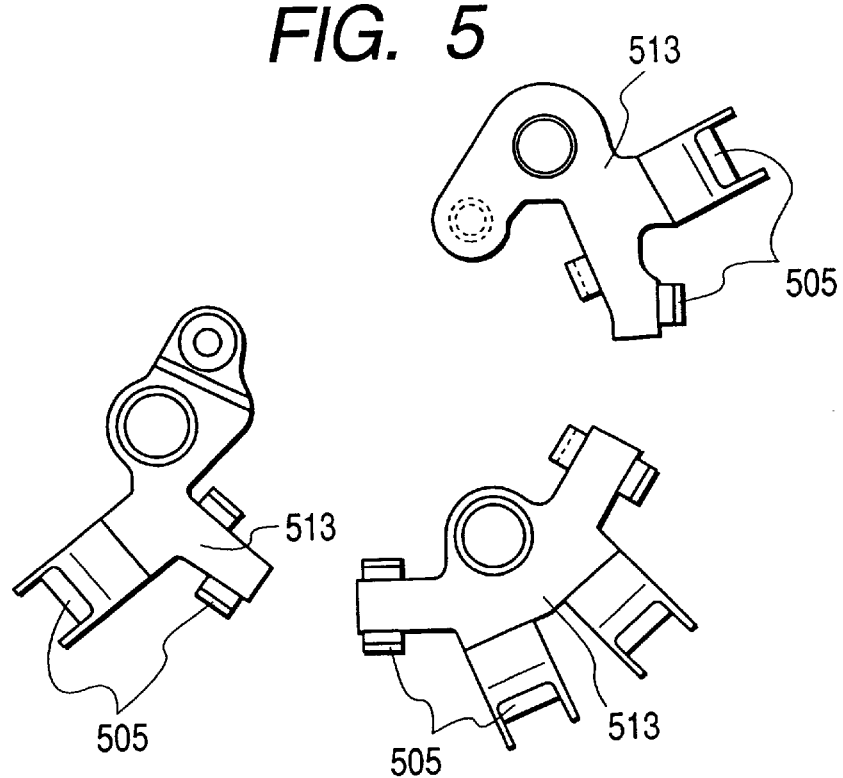
FIG. 5 is a view showing an arrangement of terminal bases of the automotive AC generator shown in FIG. 1.
Figure 6:
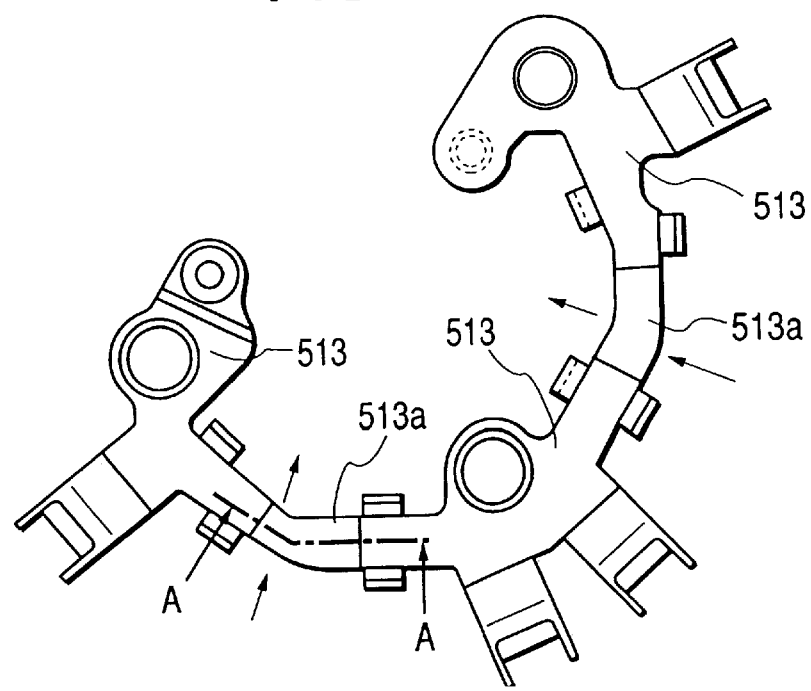
FIG. 6 is a view showing a modified arrangement of the terminal bases of the automotive AC generator shown in FIG. 1.
Figure 7:
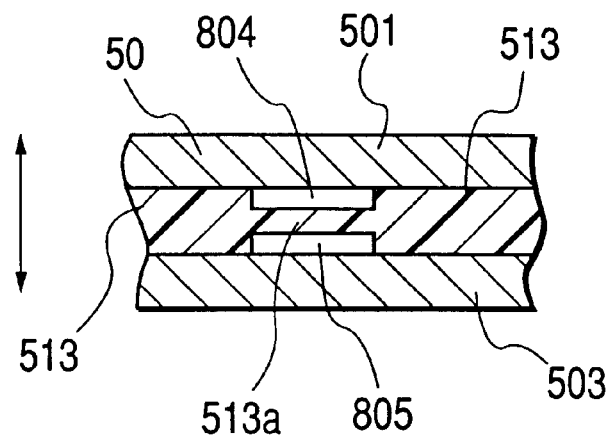
FIG. 7 is a cross-sectional view taken along a line A—A passing the terminal bases shown in FIG. 6, wherein the terminal bases are interposed between a smaller-diameter fin and a larger-diameter fin.

The above-described embodiment uses three independent resin terminals bases 513 as shown in FIG. 5. However, it is possible to integrate these terminal bases 513 by connecting them by appropriate connectors 513*a* so as to constitute an arc assembly as shown in FIG. 6. In this case, it is preferable that each connector 513*a* is thin. As shown in FIG. 7, when the connector 513*a* is thin, a clearance 804 is provided between the smaller-diameter fin 501 and the connector 513*a*. A clearance 805 is provided between the larger-diameter fin 503 and the connector 513*a*. Providing these clearances 804 and 805 makes it possible to greatly improve the installation of the terminal bases 513 without closing the cooling air passage.

Figure 8:
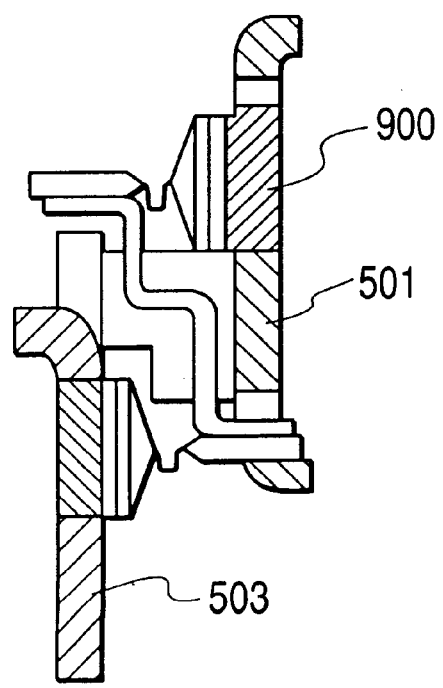
FIG. 8 is a cross-sectional view showing another example of an installation of rectifying elements to the smaller-diameter fin and the larger-diameter fin.

According to the above-described embodiment, both of the rectifying elements 502 and 504 are mounted on the smaller-diameter fin 501 and the larger-diameter fin 503 by soldering, respectively. However, as shown in FIG. 8, it is possible to secure a press-fit type rectifying element 900 to the fin, at least one of the smaller-diameter fin 501 or the larger-diameter fin 503, by press working.

Furthermore, the above-described larger-diameter fin 503 formed into the ring shape can be replaced by a horseshoe-type fin.

Figure 9:
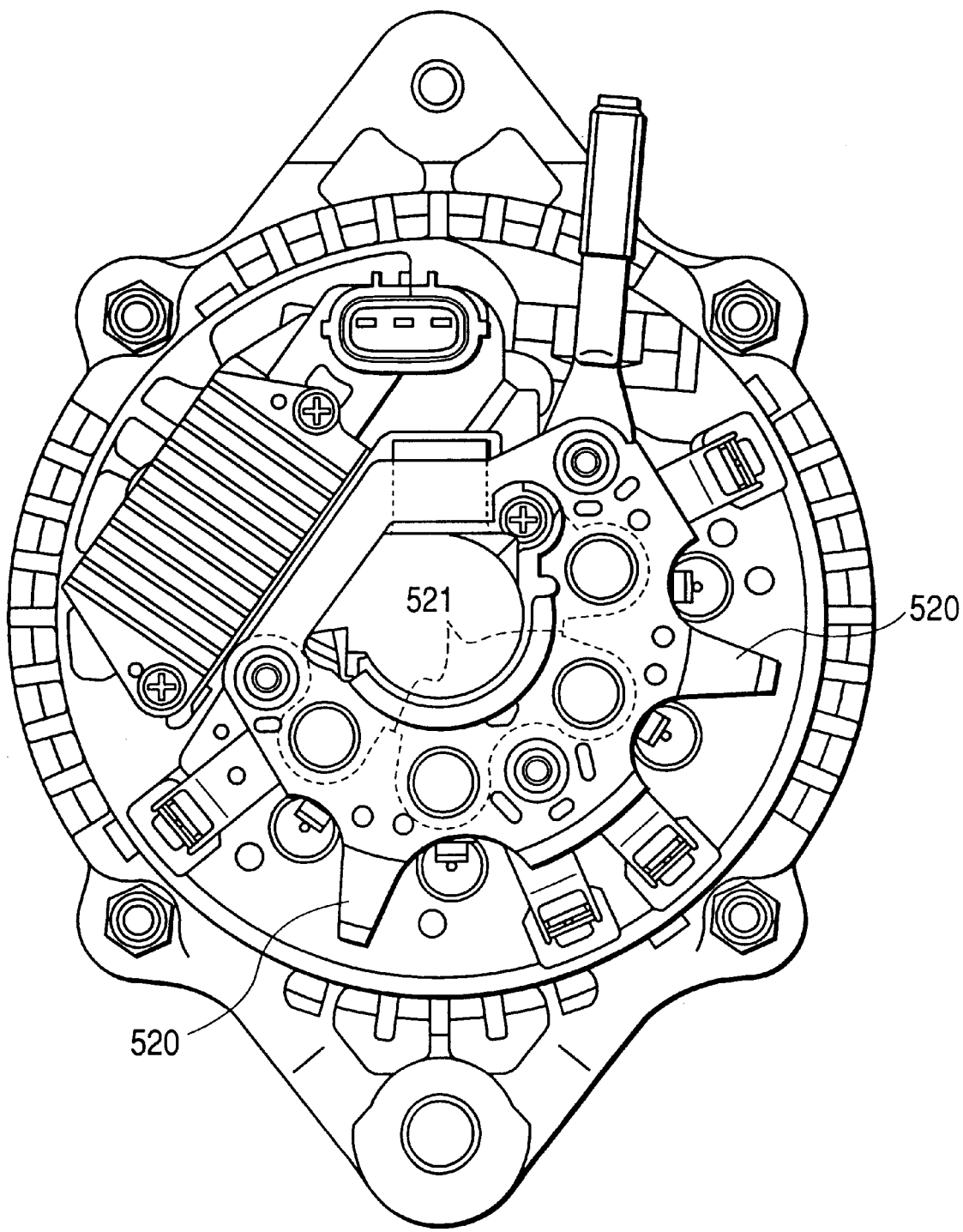
FIG. 9 is a plan view showing a modification of the automotive AC generator shown in FIG. 1 in a condition where the protecting cover is removed.

Furthermore, as shown in FIG. 9, part of the larger-diameter fin 503 can be formed into predetermined elongated portions 521 each extending to the radial-inner end of the smaller-diameter fin 501. Part of the smaller-diameter fin 501 can be formed into predetermined elongated portions 520 each extending to the radial-outer end of the larger-diameter fin 503.

The protecting cover 8 can be made of an insulating material such as nylon. This is advantageous because the durability against environments can be improved at a portion between the protecting cover 8 and the smaller-diameter fin 501. As a result, the clearance can be narrowed.

Second Embodiment

Another embodiment of the present invention will be explained with reference to FIG. 10. According to the above-described first embodiment, the rectifier 5 is disposed outside the frame 3*b*. However, according to this embodiment, the rectifier 5 is disposed inside the frame 3*b*.

More specifically, the rectifier 5 is disposed between a partition plate 9 and the frame 3*b*. The partition plate 9, which is made of an insulating material such as PPS, has a function of isolating the rectifier 5 from the air supplied from the fan 21. The rectifier 5 is integrally fixed to the bearing box support of the frame 3*b* together with the partition plate 9. The smaller-diameter fin 501, having a negative electric potential, mounts the negative rectifying elements 504 by soldering. Each negative rectifying element 504 has a lead which extends toward the larger-diameter fin 503. The larger-diameter fin 503, having a positive electric potential, mounts the positive rectifying elements 502 by soldering. Each positive rectifying element 502 has a lead which extends toward the smaller-diameter fin 501. These leads are connected to the stator lead L via the stator lead connecting terminal, in the same manner as in the first embodiment.

The above-described arrangement constitutes an AC bridge circuit. B bolt (not shown) derives an AC power output.

The smaller-diameter fin 501 and the negative rectifying elements 504 are disposed inward in a radial direction and adjacent to the frame 3*b* in an axial direction. The larger-diameter fin 503 and the positive rectifying elements 502 are disposed outward in the radial direction and adjacent to the partition plate 9 in the axial direction. An axial air inlet 801*a* is opened on an end wall of frame 3*b* at a portion adjacent to the negative rectifying elements 504. A radial air inlet 802*a* is opened on a cylindrical wall of frame 3*b* between the partition plate 9 and the larger-diameter fin 503. Thus, external air, serving as cooling air, is introduced directly to the positive and negative rectifying elements 502 and 504 in the same manner as in the first embodiment.

The partition plate 9, the smaller-diameter fin 501, the larger-diameter fin 503 and the frame 3*b* are separated one another by intervening clearances which introduce the cooling air. Each clearance has a width equal to or less than 10 mm. Thus, the cooling air passes the clearance at a higher speed. Both the smaller-diameter fin 501 and the larger-diameter fin 503 are adequately cooled by the cooling air.

The smaller-diameter fin 501 has the rib 511 formed at a radial-outer end thereof. The rib 511 is bent toward the frame 3b. Thus, the cooling air introduced from the axial air inlet 801a can be guided to the rectifying elements by the smaller-diameter fin 501. This is advantageous because the flow speed of the cooling air can be increased in the vicinity of the rectifying elements. The heat transfer coefficient is improved. The smaller-diameter fin 501 can secure a sufficient surface area. Thus, the cooling performance can be further improved. Furthermore, the smaller-diameter fin 501 functions as a flow regulating plate which causes the introduced cooling air to flow smoothly. Thus, fan noise can be reduced. Moreover, the rib 511 is bent far away from the larger-diameter fin 503 which has a different electric potential. This arrangement brings an auxiliary effect that any deposition of foreign materials or corrosion products can be avoided.

The larger-diameter fin 503 has the rib 512 formed at a radial-inner end thereof The rib 512 is bent toward the fan 21. This arrangement is advantageous because the cooling air introduced from the radial air inlet 802a is smoothly guided by the larger-diameter fin 503 toward the cooling fan 21. Accordingly, the flow speed of the cooling air is increased in the vicinity of the rectifying elements. The heat transfer coefficient is improved. The larger-diameter fin 503 can secure a sufficient surface area. Thus, the cooling performance can be further improved. Furthermore, the rib 512 are cooperative with the remaining portion of the larger-diameter fin 503 to function as a flow regulating plate which causes the introduced cooling air to flow smoothly. Fan noise can be reduced. Moreover, the rib 512 is bent far away from the smaller-diameter fin 501 which has a different electric potential. This arrangement brings an auxiliary effect that any deposition of foreign materials or corrosion products can be avoided.

Figure 10:
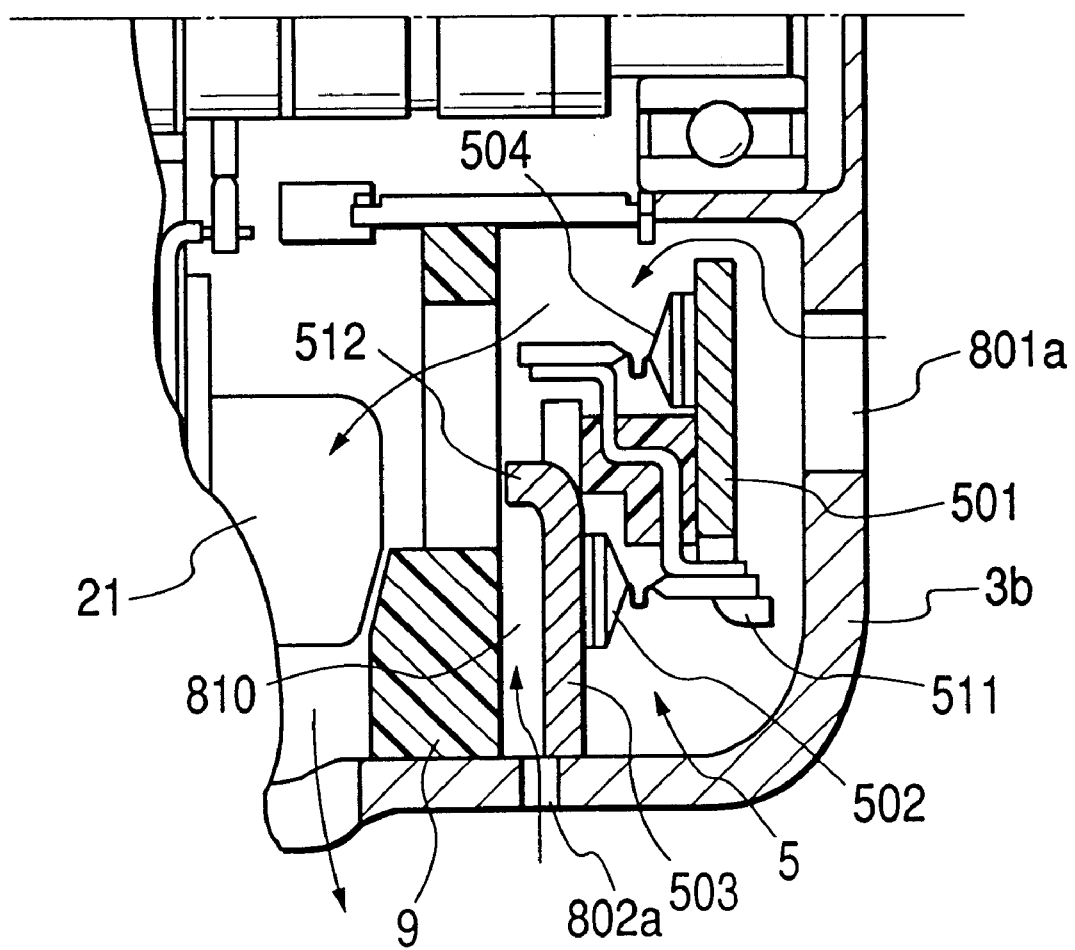
FIG. 10 is a partly cross-sectional view showing an automotive AC generator in accordance with a second embodiment of the present invention.
Figure 11:
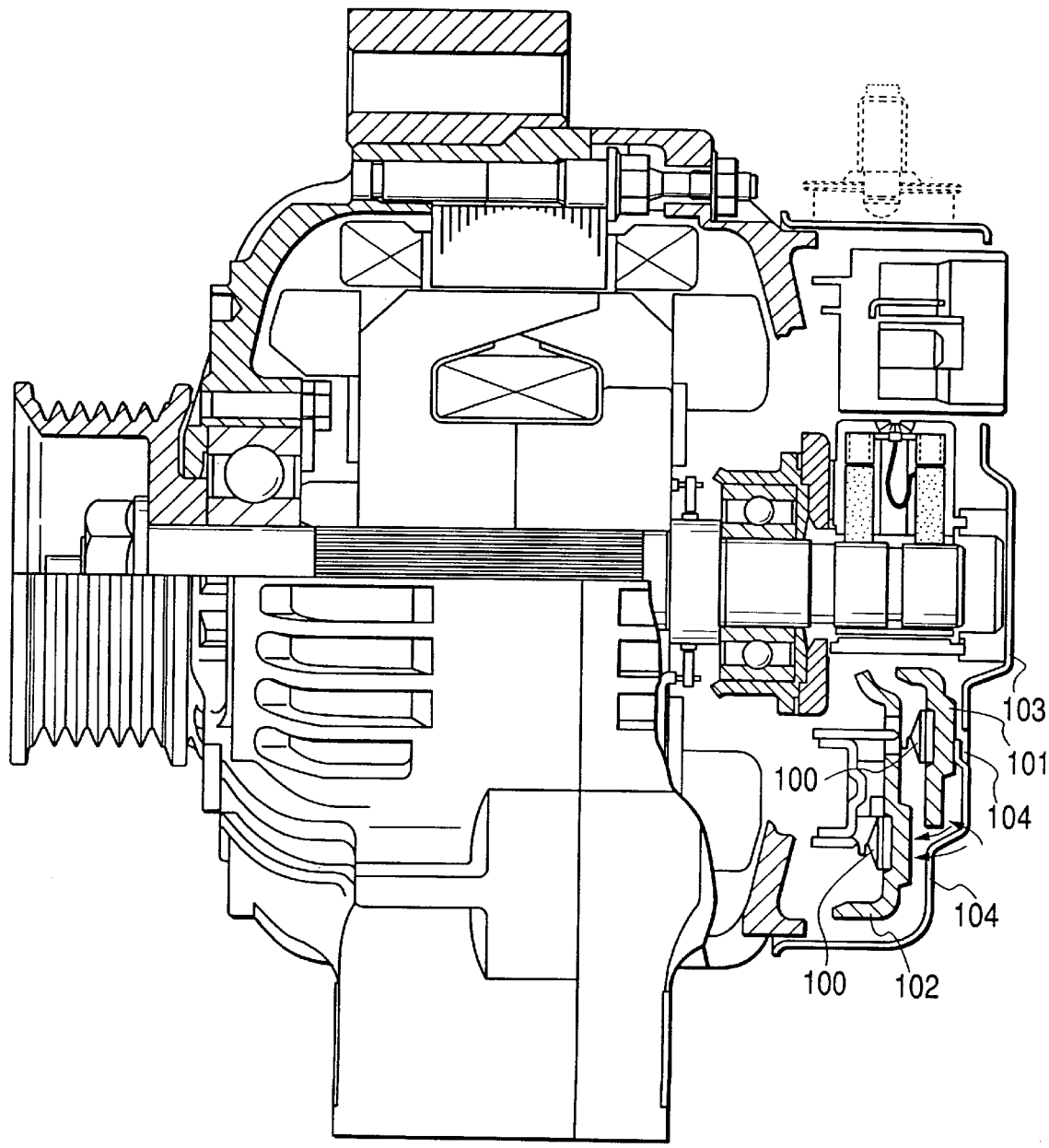
FIG. 11 is a partly cross-sectional view showing, a conventional automotive AC generator.

According to the above-described arrangement shown in FIG. 10, the partition plate 9 is fixed with the rectifier 5 so as to form a parallel surface at the end of the cooling fan 21. Thus, the partition plate 9 functions as a shroud. However, it is possible to integrate the partition plate 9 with the rotor at the end face of the rotor fan.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An automotive AC generator comprising a stator, a rotor, bearings supporting said rotor rotatably, a rectifier disposed at an axial direction of said rotor, a protecting cover covering said rectifier, and a frame securely fixing said stator, said bearings, said rectifier and said protecting cover, wherein, said rectifier comprises negative rectifying elements, a larger-diameter fin of negative electric potential which mounts said negative rectifying elements, positive rectifying elements, a smaller-diameter fin of positive electric potential which mounts said positive rectifying elements, each of said rectifying elements has a lead, and said rectifier is disposed between said frame and said protecting cover;

said larger-diameter fin is disposed adjacent to said frame with a predetermined axial clearance;

said smaller-diameter fin is disposed adjacent to said protecting cover with a predetermined axial clearance;

said larger-diameter and smaller-diameter fins are arranged parallel to each other in an axial direction with a predetermined clearance so that said leads extend in opposite directions in a space between said larger-diameter and smaller-diameter fins;

a radial-inner end of said larger-diameter fin is disposed adjacent to said positive rectifying elements, and positioned radially outward than a radial position of said positive rectifying elements;

a radial-outer end of said smaller-diameter fin is disposed adjacent to said negative rectifying elements, and positioned radially inward than a radial position of said negative rectifying elements;

said protecting cover has an axial opening which introduces external air directly to a central position of said positive rectifying element;

a radial ventilation passage is disposed between said larger-diameter fin and said frame so as to pass a central position of said negative rectifying element; and an opening is formed at least at one selected from the group consisting of a portion on said protecting cover, a clearance between said frame and said protecting cover, and a clearance between said larger-diameter fin and said protecting cover, for introducing external air directly to a radial-outer end of said radial ventilation passage.

2. The automotive AC generator in accordance with claim 1, wherein said frame is directly brought into contact with and fixed to said larger-diameter fin which mounts said negative rectifying elements.

3. The automotive AC generator in accordance with claim 1, wherein said smaller-diameter fin has a rib formed at least partly on a radial-inner or radial-outer end thereof, and said rib of said smaller-diameter fin extends in an axial direction away from said larger-diameter fin.

4. The automotive AC generator in accordance with claim 1, wherein said larger-diameter fin has a rib formed at a radial-inner end thereof, and said rib of said larger-diameter fin extends toward said rotor in an axial direction away from said smaller-diameter fin.

5. The automotive AC generator in accordance with claim 1, wherein said smaller-diameter fin has a closed ring shape.

6. The automotive AC generator in accordance with claim 1, wherein a terminal base is interposed between said smaller-diameter fin and said larger-diameter fin to support said smaller-diameter fin and said larger-diameter fin in an insulated condition, said terminal base having a stator lead terminal for connecting said connecting terminals to said stator, said frame has a support portion supporting said bearing and extending in a radial direction, and a cooling air inlet divided by said supporting portion, said rectifier is fixed to said supporting portion of said frame together with said terminal base, and said terminal base has a ventilation passage communicating with said cooling air inlet and positioned between said terminal base and said support portion of said frame as well as between said terminal base and at least one of said smaller-diameter fin and said larger-diameter fin.

7. The automotive AC generator in accordance with claim 1, wherein said smaller-diameter fin has a rib formed at least partly on a radial-inner or radial-outer end thereof, and said rib of said smaller-diameter fin extends in an axial direction away from said larger-diameter fin, said larger-diameter fin has a rib formed at a radial-inner end thereof, and said rib of said larger-diameter fin extends toward said rotor in an axial direction away from said smaller-diameter fin.

8. The automotive AC generator in accordance with claim 1, wherein said larger-diameter fin has a rib formed at a radial-inner end thereof, and said rib of said larger-diameter fin extends toward said rotor in an axial direction away from said smaller-diameter fin, and said smaller-diameter fin has a closed ring shape.

9. The automotive AC generator in accordance with claim 1, wherein said smaller-diameter fin has a rib formed at least partly on a radial-inner or radial-outer end thereof, said rib of said smaller-diameter fin extends in an axial direction away from said larger-diameter fin, and said smaller-diameter fin has a closed ring shape.

10. The automotive AC generator in accordance with claim 1, wherein said smaller-diameter fin has a rib formed at least partly on a radial-inner or radial-outer end thereof, said rib of said smaller-diameter fin extends in an axial direction away from said larger-diameter fin, and said smaller-diameter fin has a closed ring shape, a terminal base is interposed between said smaller-diameter fin and said larger-diameter fin to support said smaller-diameter fin and said larger-diameter fin in an insulated condition, said terminal base having a stator lead terminal for connecting said connecting terminals to said stator, said frame has a support portion supporting said bearing and extending in a radial direction, and a cooling air inlet divided by said supporting portion, said rectifier is fixed to said supporting portion of said frame together with said terminal base, and said terminal base has a ventilation passage communicating with said cooling air inlet and positioned between said terminal base and said support portion of said frame as well as between said terminal base and at least one of said smaller-diameter fin and said larger-diameter fin.

11. The automotive AC generator in accordance with claim 1, wherein said frame is directly brought into contact with and fixed to said larger-diameter fin which mounts said negative rectifying elements, said smaller-diameter fin has a rib formed at least partly on a radial-inner or radial-outer end thereof, said rib of said smaller-diameter fin extends in an axial direction away from said larger-diameter fin, and said smaller-diameter fin has a closed ring shape, a terminal base is interposed between said smaller-diameter fin and said larger-diameter fin to support said smaller-diameter fin and said larger-diameter fin in an insulated condition, said terminal base having a stator lead terminal for connecting said connecting terminals to said stator, said frame has a support portion supporting said bearing and extending in a radial direction, and a cooling air inlet divided by said supporting portion, said rectifier is fixed to said supporting portion of said frame together with said terminal base, and said terminal base has a ventilation passage communicating with said cooling air inlet and positioned between said terminal base and said support portion of said frame as well as between said terminal base and at least one of said smaller-diameter fin and said larger-diameter fin.

12. The automotive AC generator in accordance with claim 1, wherein said frame is directly brought into contact with and fixed to said larger-diameter fin which mounts said negative rectifying elements, said smaller-diameter fin has a rib formed at least partly on a radial-inner or radial-outer end thereof, said rib of said smaller-diameter fin extends in an axial direction away from said larger-diameter fin, a terminal base is interposed between said smaller-diameter fin and said larger-diameter fin to support said smaller-diameter fin and said larger-diameter fin in an insulated condition, said terminal base having a stator lead terminal for connecting said connecting terminals to said stator, said frame has a support portion supporting said bearing and extending in a radial direction, and a cooling air inlet divided by said supporting portion, said rectifier is fixed to said supporting portion of said frame together with said terminal base, and said terminal base has a ventilation passage communicating with said cooling air inlet and positioned between said terminal base and said support portion of said frame as well as between said terminal base and at least one of said smaller-diameter fin and said larger-diameter fin.

13. An automotive AC generator comprising a stator, a rotor, bearings supporting said rotor rotatably, a cooling fan disposed at least at one axial end of said rotor, a rectifier disposed at an axial direction of said rotor, a partition plate isolating said rectifier from said cooling fan, and a frame securely fixing said stator, said and said rectifier, wherein, said rectifier comprises positive rectifying elements, a larger-diameter fin of positive electric potential which mounts said positive rectifying elements, negative rectifying elements, a smaller-diameter fin of negative electric potential which mounts said negative rectifying elements, each of said rectifying elements has a lead, and said rectifier is disposed between said frame and said partition plate;

said larger-diameter fin is disposed adjacent to said partition plate with a predetermined axial clearance;

said smaller-diameter fin is disposed adjacent to said frame with a predetermined axial clearance;

said larger-diameter and smaller-diameter fins are arranged parallel to each other in an axial direction with a predetermined clearance so that said leads extend in opposite directions in a space between said larger-diameter and smaller-diameter fins;

a radial-inner end of said larger-diameter fin is disposed adjacent to said negative rectifying elements, and positioned radially outward than a radial position of said negative rectifying elements;

a radial-outer end of said smaller-diameter fin is disposed adjacent to said positive rectifying elements, and positioned radially inward than a radial position of said positive rectifying elements;

said frame has an axial opening which introduces external air directly to a central position of said negative rectifying element;

a radial ventilation passage is disposed between said larger-diameter fin and said partition plate so as to pass a central position of said positive rectifying element; and an opening is formed on said frame for introducing external air directly to a radial-outer end of said radial ventilation passage.

14. The automotive AC generator in accordance with claim 13, wherein said frame is directly brought into contact with and fixed to said fin which mounts said negative rectifying elements.

15. The automotive AC generator in accordance with claim 13, wherein said smaller-diameter fin has a rib formed at least partly on a radial-inner or radial-outer end thereof, and said rib of said smaller-diameter fin extends in an axial direction away from said larger-diameter fin.

16. The automotive AC generator in accordance with claim 13, wherein said larger-diameter fin has a rib formed at a radial-inner end thereof, and said rib of said larger-diameter fin extends toward said rotor in an axial direction away from said smaller-diameter fin.

17. The automotive AC generator in accordance with claim 13, wherein said smaller-diameter fin has a closed ring shape.

18. The automotive AC generator in accordance with claim 13, wherein a terminal base is interposed between said smaller-diameter fin and said larger-diameter fin to support said smaller-diameter fin and said larger-diameter fin in an insulated condition, said terminal base having a stator lead terminal for connecting said connecting terminals to said stator, said frame has a support portion supporting said bearing and extending in a radial direction, and a cooling air inlet divided by said supporting portion, said rectifier is fixed to said supporting portion of said frame together with said terminal base, and said terminal base has a ventilation passage communicating with said cooling air inlet and positioned between said terminal base and said support portion of said frame as well as between said terminal base and at least one of said smaller-diameter fin and said larger-diameter fin.

19. The automotive AC generator in accordance with claim 13, wherein said smaller-diameter fin has a rib formed at least partly on a radial-inner or radial-outer end thereof, and said rib of said smaller-diameter fin extends in an axial direction away from said larger-diameter fin, said larger-diameter fin has a rib formed at a radial-inner end thereof, and said rib of said larger-diameter fin extends toward said rotor in an axial direction away from said smaller-diameter fin.

20. The automotive AC generator in accordance with claim 13, wherein said larger-diameter fin has a rib formed at a radial-inner end thereof, and said rib of said larger-diameter fin extends toward said rotor in an axial direction away from said smaller-diameter fin, and said smaller-diameter fin has a closed ring shape.

21. The automotive AC generator in accordance with claim 13, wherein said smaller-diameter fin has a rib formed at least partly on a radial-inner or radial-outer end thereof, said rib of said smaller-diameter fin extends in an axial direction away from said larger-diameter fin, and said smaller-diameter fin has a closed ring shape.

* * * * *